H. H. KHOUBESSERIAN.
MANURE POUCH.
APPLICATION FILED AUG. 24, 1915.

1,175,773.

Patented Mar. 14, 1916.
2 SHEETS—SHEET 1.

Inventor
H. H. Khoubesserian.

Witnesses

By Victor J. Evans
Attorney

H. H. KHOUBESSERIAN.
MANURE POUCH.
APPLICATION FILED AUG. 24, 1915.
1,175,773.
Patented Mar. 14, 1916.
2 SHEETS—SHEET 2.
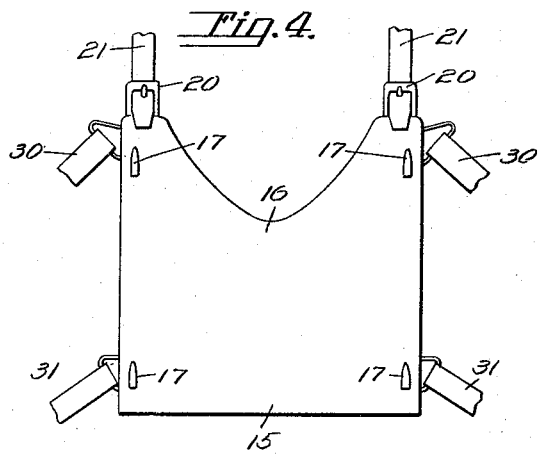
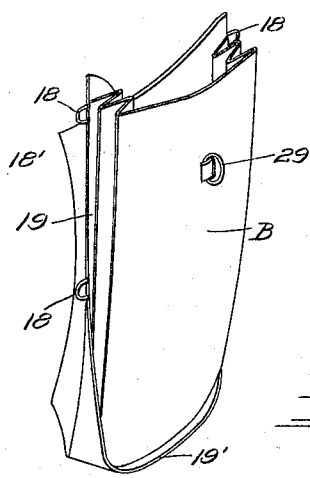
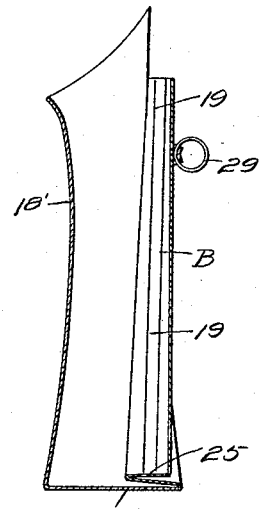
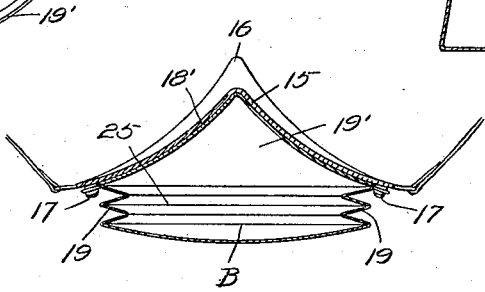
Inventor
H. H. Khoubesserian.
Witnesses
F. C. Gibson.
By Victor J. Evans
Attorney
THE COLUMBIA PLANOGRAPH CO., WASHINGTON, D. C.

UNITED STATES PATENT OFFICE.

HAGOP H. KHOUBESSERIAN, OF BOSTON, MASSACHUSETTS.

MANURE-POUCH.

1,175,773.

Specification of Letters Patent.  Patented Mar. 14, 1916.

Application filed August 24, 1915. Serial No. 47,186.

*To all whom it may concern:*

Be it known that I, HAGOP H. KHOUBESSERIAN, a Turkish subject, residing at Boston, in the county of Suffolk and State of Massachusetts, have invented new and useful Improvements in Manure-Pouches, of which the following is a specification.

This invention relates to manure pouches adapted to be attached to the harness of horses and other draft animals for the purpose of receiving the droppings of horses and other draft animals, thereby keeping the streets free from objectionable litter.

The invention has for its object to produce a manure pouch of simple and improved construction which will be detachably mounted in such a manner as to be readily detachable for the purpose of emptying the same, the pouch being also capable of being quickly and conveniently replaced in position.

A further object of the invention is to produce a collapsible manure pouch which when empty will occupy very little space and cause no annoyance to the animal.

A further object of the invention is to produce a device of the character described, embodying a shield which is connected with the harness and a pouch which is detachably connected with the shield, the shield intervening between the pouch and the limbs of the animal to avoid chafing the latter.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
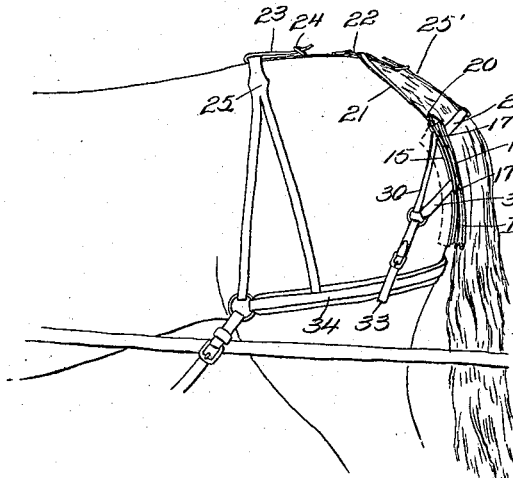
Figure 2:
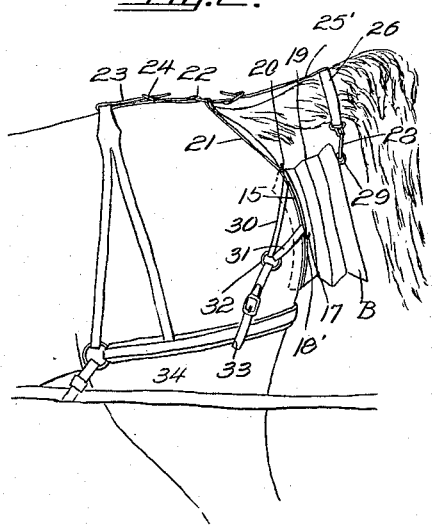
Figure 3:
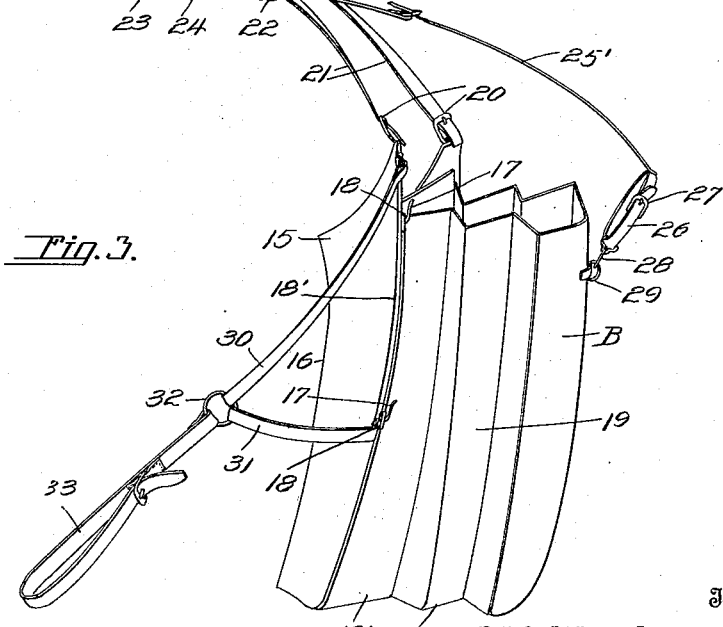

In the drawings—Figure 1 is a view in side elevation showing the improved device applied to a horse. Fig. 2 is a side elevation similar to Fig. 1, but showing the pouch distended. Fig. 3 is a perspective view showing the device entirely detached. Fig. 4 is a view in elevation of the shield which comprises a part of the invention, the pouch having been detached therefrom. Fig. 5 is a perspective view showing the pouch attached. Fig. 6 is a vertical sectional view of the pouch. Fig. 7 is a horizontal sectional view taken through the pouch and the shield. Fig. 8 is a detail view in side elevation showing a slight modification in the construction of the shield.

Corresponding parts in the several figures are denoted by like characters of reference.

The shield 15 of the improved device may be constructed of leather, rubber or other material, suitably stiffened and reinforced, said shield being suitably shaped to fit the limbs of the animal beneath the tail, said shield being concavely curved at the upper edge thereof, and provided with a vertical crease or fold 16. The shield 15 which may be made of any desired dimensions is provided near the side edges thereof with attaching means, such as hooks 17, for the purpose of detachably supporting the pouch B which is provided with eyes 18 to engage the hooks 17, it being, however, understood that any other well known fastening or attaching means may be substituted for the hooks and eyes herein shown. The pouch B which may be constructed of leather, rubber or other suitable material, or of any desired combination of materials, is collapsible, and to this end the side members or side portions 19 of said pouch are preferably constructed like the bellows of an accordion. The front wall member 18' of the pouch is constructed of relatively rigid or reinforced material in order that it will hold its shape, said front member being substantially V-shaped in cross section so that it will fit in the crease 16 formed in the shield 15 and also to fit the contour of the limbs of the animal. The bottom member 19' is likewise of rigid material, said bottom member being of approximately triangular shape to present a straight rear edge with which the collapsible bottom portion 35 may be connected. By this construction a collapsible pouch of large capacity will be formed. the same occupying so little space as to be hardly noticeable under ordinary circumstances.

The shield 15 is provided near its upper corners with buckles 20 with which straps 21 are adjustably connected, said straps being connected at their upper ends with a ring 22. The ring 22 may be connected by a strap 23 having a buckle 24 with the back band 25 or some other suitable part of the draft harness. Another strap 25', which is adjustably connected with the ring 22, carries at the end thereof a transverse strap 26 which may be looped around the tail of the animal, as clearly seen in Figs. 1 and 2, said strap 26 having a buckle 27 whereby the ends thereof may be connected. The looped strap 26 carries a snap hook 28 which may be detachably connected with a ring 29 on the rear face of the pouch B. The looped strap 26 may take the place of the ordinary crupper.

The side edges of the shield are each connected by straps 30, 31 with a ring or link 32, said links being in turn connected by looped straps 33 with the breeching 34 of the harness for the purpose of holding the shield as well as the pouch carried thereby with additional security.

From the foregoing description taken in connection with the drawings hereto annexed. the operation and advantages of this invention will be readily understood. The shield having the pouch connected therewith may be very readily and quickly attached to the harness before or after the same is applied to the animal. When the animal elevates his tail the pouch will be distended to receive the droppings, as will be readily understood. The pouch may at any time be very quickly detached, emptied of its contents and replaced, this operation requiring but a few moments' time.

In cities where it is highly important for esthetic as well as for sanitary reasons to keep the streets clean and free from litter, this invention will be found of particular advantage, and it is evident that if suitable cans or receptacles are provided at convenient intervals the pouches may be emptied by the drivers of vehicles whenever necessary.

In Fig. 8 has been shown a slight modification in the construction of the shield. As previously stated, this shield is suitably shaped to fit the limbs of the animal beneath the tail. The shield illustrated in Fig. 8, and which is here designated by 16', is provided with a recess or depression 16'', whereby it is rendered particularly adapted for mares to avoid any undue obstruction to urination.

Having thus described the invention, what is claimed as new, is:—

1. In a device of the class described, a rigid shield, supporting means for the same, a pouch having a rigid front wall member, and means for detachably supporting the pouch on the shield.

2. In a device of the class described, a rigid shield having a vertical crease, supporting means for said shield, a pouch having a rigid front wall member of V-shaped cross section conforming to the cross sectional shape of the shield, and means for detachably supporting the pouch on the shield.

3. In a device of the class described, a rigid shield having a vertical crease, supporting means for said shield, and a collapsible pouch having a rigid front wall member conforming to the cross sectional shape of the shield, a rear wall member, a rigid bottom portion of triangular shape, and accordion side and bottom portions; and means whereby said pouch may be detachably connected with the shield and supported thereon.

4. In a device of the class described, a rigid shield, means for connecting said shield with a harness to be supported thereby, a collapsible pouch detachably connected with the shield, said pouch including a rigid front wall member, a rigid bottom portion, a rear wall member, and accordion side and bottom portions, a tail-encircling loop or crupper member, and supporting means therefor, and means for detachably connecting said crupper member with the rear wall member of the collapsible pouch.

In testimony whereof I affix my signature in presence of two witnesses.

HAGOP H. KHOUBESSERIAN.

Witnesses:
 ARAM SEGHPOSSIAN,
 GLADYS A. FERNANDEZ.

Copies of this patent may be obtained for five cents each, by addressing the "Commissioner of Patents, Washington, D. C."